US009403484B2

United States Patent
Brandt et al.

(10) Patent No.: US 9,403,484 B2
(45) Date of Patent: Aug. 2, 2016

(54) SYSTEM FOR CONTROLLING THE ADJUSTMENT OF A SIDE REARVIEW DEVICE

(71) Applicant: Trailertrack APS, Taastrup (DK)

(72) Inventors: Tajs Brandt, Tikøb (DK); Jacob Hatt, Køge (DK)

(73) Assignee: Trailertrack APS, Taastrup (DK)

( * ) Notice: Subject to any disclaimer, the term of this patent is extended or adjusted under 35 U.S.C. 154(b) by 0 days.

(21) Appl. No.: 14/358,469

(22) PCT Filed: Nov. 28, 2012

(86) PCT No.: PCT/DK2012/000126
§ 371 (c)(1),
(2) Date: May 15, 2014

(87) PCT Pub. No.: WO2013/079068
PCT Pub. Date: Jun. 6, 2013

(65) Prior Publication Data
US 2014/0330487 A1 Nov. 6, 2014

(30) Foreign Application Priority Data
Nov. 28, 2011 (DK) .................................. 2011 00931

(51) Int. Cl.
*B60R 1/02* (2006.01)
*B60R 1/06* (2006.01)

(52) U.S. Cl.
CPC ............... *B60R 1/025* (2013.01); *B60R 1/0612* (2013.01)

(58) Field of Classification Search
USPC ........................................................ 701/49
See application file for complete search history.

(56) References Cited

U.S. PATENT DOCUMENTS

| 6,140,933 A | 10/2000 | Bugno et al. |
| 6,390,631 B1 * | 5/2002 | Lang ....................... B60R 1/025 307/10.1 |
| 8,044,776 B2 * | 10/2011 | Schofield ................ B60C 23/00 340/425.5 |

(Continued)

FOREIGN PATENT DOCUMENTS

| EP | 94817 A2 * | 11/1983 | ................ B60R 1/06 |
| EP | 0293396 | 12/1988 | |

(Continued)

OTHER PUBLICATIONS

PCT International Search Report in PCT/DK2012/00126, mailed Feb. 6, 2013, 3 pages.

*Primary Examiner* — Rami Khatib
*Assistant Examiner* — Timothy Nesley
(74) *Attorney, Agent, or Firm* — Servilla Whitney LLC (57) ABSTRACT

The invention relates to a system for controlling the adjustment of a side rearview mirror mounted on a vehicle, where the system comprises at least one side rearview mirror operated by a motor controlled by a control unit, wherein the system comprises at least one direction guide, where the direction guide comprises at least one gyro, where sensing devices in contact with the gyro determines a change in direction of the vehicle and provides corresponding output data, where the control unit comprises a data processor provided for determining the adjustment of the rearview mirror, where the processor is adapted for reading output data from the sensing device and based on at least the sensing device output provide a control signal for the motor operating the mirror and where the motor is adapted for adjusting the mirror accordingly.

13 Claims, 6 Drawing Sheets

(56) References Cited

U.S. PATENT DOCUMENTS

| | | | |
|---|---|---|---|
| 8,192,036 B2* | 6/2012 | Lee | B60R 1/025 359/843 |
| 2005/0130783 A1* | 6/2005 | Standen | 475/15 |
| 2008/0130149 A1 | 6/2008 | Blank et al. | |
| 2009/0046538 A1* | 2/2009 | Breed | B60C 11/24 367/93 |
| 2010/0085652 A1* | 4/2010 | Crouse | B60R 1/025 359/843 |
| 2012/0296567 A1* | 11/2012 | Breed | G01C 21/26 701/468 |
| 2014/0063233 A1* | 3/2014 | Henion et al. | 348/118 |
| 2014/0185311 A1* | 7/2014 | Sharghi | 362/520 |
| 2014/0250990 A1* | 9/2014 | Matsunaga | H02P 1/00 73/114.01 |
| 2015/0042797 A1* | 2/2015 | Alam | B60R 11/04 348/148 |
| 2015/0049193 A1* | 2/2015 | Gupta et al. | 348/148 |

FOREIGN PATENT DOCUMENTS

| | | |
|---|---|---|
| EP | 1026035 | 8/2000 |
| EP | 1026045 | 8/2000 |
| EP | 2181898 | 5/2010 |
| WO | WO-88/04619 | 6/1988 |
| WO | WO-89/00935 | 2/1989 |
| WO | WO-95/23079 | 8/1995 |
| WO | WO-2006/076105 | 7/2006 |
| WO | WO-2009/002518 | 12/2008 |

\* cited by examiner

SYSTEM FOR CONTROLLING THE ADJUSTMENT OF A SIDE REARVIEW DEVICE

CROSS-REFERENCE TO RELATED APPLICATIONS

This application is the national stage entry of International Application No. PCT/DK2012/000126, filed on Nov. 28, 2012, which claims priority to Danish Patent Application No. PA 2011 00931, filed on Nov. 28, 2011, both of which are incorporated herein by reference in their entireties.

FIELD OF THE INVENTION

The present invention relates to a system for controlling the adjustment of a side rearview device mounted on a vehicle, which system comprises at least one side rearview device, e.g. a mirror or a camera operated by a motor controlled by a control unit.

BACKGROUND OF THE INVENTION

When driving a vehicle and in particular a large truck the side view and the rear view is important. The rear view is particular important when the vehicle is about to make a turn, such as a right turn or a left turn. However, during a right turn or a left turn blind spots may occur for the driver, which may lead to dangerous situations in particular in cities where there are several road users including vulnerable road users such as pedestrians and cyclist. Every year such vulnerable road users are run down in accidents by turning trucks. These accidents often lead to severe injuries or even death.

Manufacturers of vehicles are continuously looking for new systems and improvements for vehicles to prevent such vehicular accidents, and protect vulnerable road users and assist drivers to avoid accidents. One known vehicle safety system automatically turns the vehicle's headlights when the vehicle is turning around a corner to allow the driver to see more of the road ahead.

Vehicle side rearview mirrors are oriented to provide the driver with an optimum rear viewing zone behind and to the left and right of the vehicle to allow the driver to operate the vehicle more safely. However, when the vehicle is travelling around a corner, changing lanes, merging into a lane of traffic, etc., because the rear viewing zone is fixed there may be a blind spot in the optimum rear viewing angle that may prevent the driver from seeing other vehicles or road users.

To overcome these problems side rearview mirror control systems for vehicles have been developed, where the system automatically changes the rear viewing angle of a vehicle side rearview mirror during certain vehicle operating conditions. The control system receives various vehicle inputs to determine if and when a driver will turn the vehicle, make a lane change, merge into a lane of traffic, etc. The system pivots one or both of the side rearview mirrors to eliminate a potential blind spot during these conditions. In some of these systems, the rearview mirror control system receives input signals from one or more of a vehicle hand-wheel angle sensor, a vehicle yaw rate sensor, a vehicle speed sensor, a turn signal indicator, a global positioning system (GPS) receiver and map information to determine whether the vehicle is turning or will be turning.

Such above mentioned rearview control systems are e.g. disclosed in the international patent applications WO 89/00935 and WO 2006/076105 A2. Also European patent no. 0 293 396 B1 discloses such a system.

From WO 95/23079 a system is known, which uses two electronic compasses or fluxgate compasses in relation to the adjustment of the side rearview mirror. Although such mirror may function well the risk exists that the compass will be influenced by disturbing fields and hence may provide a faulty adjustment signal. This is obviously undesirable.

Although, such systems may function very well and improve traffic safety they are, however, rather complicated to produce and mount on a vehicle. The known systems require multiple types of sensors which may be susceptible to external factors like rain, dirt etc. The known systems may also require GPS and other devices mounted on the vehicle. All these factors complicate and increase the costs of the known rearview control systems. Other system may lack the desired reliability.

Consequently, an object of the present invention is to provide a system for controlling the adjustment side rearview devices on a vehicle which system is simple and reliable.

SUMMARY OF THE INVENTION

In order to achieved the objective of the invention a system for controlling the adjustment of a side rearview device mounted on a vehicle has been provided, where the system comprises at least one side rearview device operable to change view area, wherein the system comprises at least one direction guide, where the direction guide comprises at least one kinetic sensing device registering change of movement direction of the vehicle, and provides corresponding output signal, where the control unit comprises a data processor provided for determining the adjustment of the rearview device, where the processor is adapted for reading output signals from the sensing device and based on at least the sensing device output provide a control signal for adjusting the rearview area and where the rearview device is adapted for adjusting the rear view area accordingly.

The invention is particularly suitable for larger trucks transporting heavy freight containers, however, the system is also suitable for buses, vans, and cars and other vehicles coupled with trailers. The invention provides a system for actively reducing blind spots in a driver's rear wear, which system is relatively simple and uncomplicated and not sensible to extern factors. One particular advantageous feature is that the system need only be mounted in one vehicle part, i.e. not in both the tractor and the trailer as prescribed in many previously known systems.

In this context the term side rearview device may also comprise a camera. If the camera option is used, a monitor for showing the camera view is placed inside the vehicle. The kinetic direction guides are gyros, accelerometers or alternative similar sensors.

The present invention is based on the finding that an adjustable, e.g. motor driven, rearview mirror or camera mounted on a vehicle can be controlled by a control unit comprising at least one direction guide selected from a gyro or a accelerometer. A gyro or an accelerometer are devices that are sensitive to a change in a direction and, consequently, it has been realized that this sensitivity can be utilized to adjust a side rearview device to provide an optimum rearview for a driver in a vehicle, without disturbance from non-controllable fields.

In a preferred embodiment of the system the vehicle is towing a trailer and at least one direction guide is mounted on the towing vehicle and at least one direction guide is mounted on the trailer. In this particular embodiment the system will register when the vehicle or the trailer changes direction. The system will also be able to register if the vehicle changes direction in respect of the trailer and vice versa. The registered information can be used by the control unit to adjust the side rearview.

In an embodiment of the system according to the invention the control unit comprises two gyros or accelerometers. When two gyros/accelerometers are used simultaneously it is possible to calibrate the gyros/accelerometers to provide a very precise and rapid indication of when the vehicle and/or trailer change direction which indication can initiate the control unit to correct the position of the rear mirror/camera, whereby an optimum rearview for the driver is obtained. Some gyros may, however, be used without requiring calibration.

It will also be possible to provide embodiments where one or more gyro is combined with one or more electronic compasses or alternatively sensors. The sensors could be either gyros, compasses, any combination of the two, or any sensors with the same capabilities of measuring changes in angles. In the following the invention is explained with reference to gyros i.e. two gyros are used as example.

In a preferred embodiment of the system the gyros communicate with the control unit. The gyros are sensible to a change in direction of the vehicle and/or trailer on which the gyros are mounted. In case of an indication of change of direction this will be registered by the gyros, which will provide the information to the control unit through conversion of the physical signal into an electrical signal, possibly a digital signal. The control unit is adapted to receive signals from the gyros in response to a change in direction registered in the gyros and the control unit will operate the motor in response to the signals from the gyros.

Basically, the control unit will operate the motor to change the view in the side rearview device (mirror, camera) in response to the change of direction registered by the gyro. The control unit will operate the motor to change the view on the side rearview mirror so the driver will obtain the best possible rear view where blind spots substantially are avoided.

In a preferred embodiment of the system the system comprises one side rearview mirror. In this embodiment it is appropriate to mount the side rearview mirror in the opposite side of the vehicle of which the driver is sitting. Consequently, when the driver is sitting in the left side of the vehicle the side rearview mirror should be mounted on the right side of the vehicle and vice versa.

In a further preferred embodiment of the system according to the present invention the system comprises two side rearview mirrors or cameras. This embodiment allows a side rearview mirror or cameras according to the invention to be mounted on the right side and the left side of the vehicle, whereby the safety may be further improved.

Although, it for many situations will be sufficient that the control unit can operate the motor to change the view in the side rearview mirror in horizontal direction it is, however, preferred that motor can change the view in the side rearview mirror in horizontal and vertical direction, which will provide the optimum rearview in all situations and improve the safety.

In principal the system adjusts the side rearview mirror automatically, however, the system will also allow the system to be adjusted manually if required.

For the automatic adjustment another aspect of the invention relates to a method for adjusting a rearview device where the method comprises determining in a coordinate system with its center at the connection between tractor and trailer and with the tractor and trailer aligned in the same direction, the location of three main positions, the driver position, the mirror position and the trailer rear end position, further determining an angular change between the tractor and the trailer direction and based on the angular change determine a new position of the trailer rear end and finally determine a change in rearview area for the rearview device to maintain an optimum rearview. The change in rearview area is applied through a change in mirror or camera angle through motorized adjustment of the position of the rearview device, or alternatively by cropping a camera picture to show the desired area of rearview.

The invention will now be described in further details with reference to drawings where

BRIEF DESCRIPTION OF THE DRAWING

In the FIGS. 1 to 5 the same reference numbers refer to corresponding parts in the figures.

DESCRIPTION OF A PREFERRED EMBODIMENT

Figure 1:
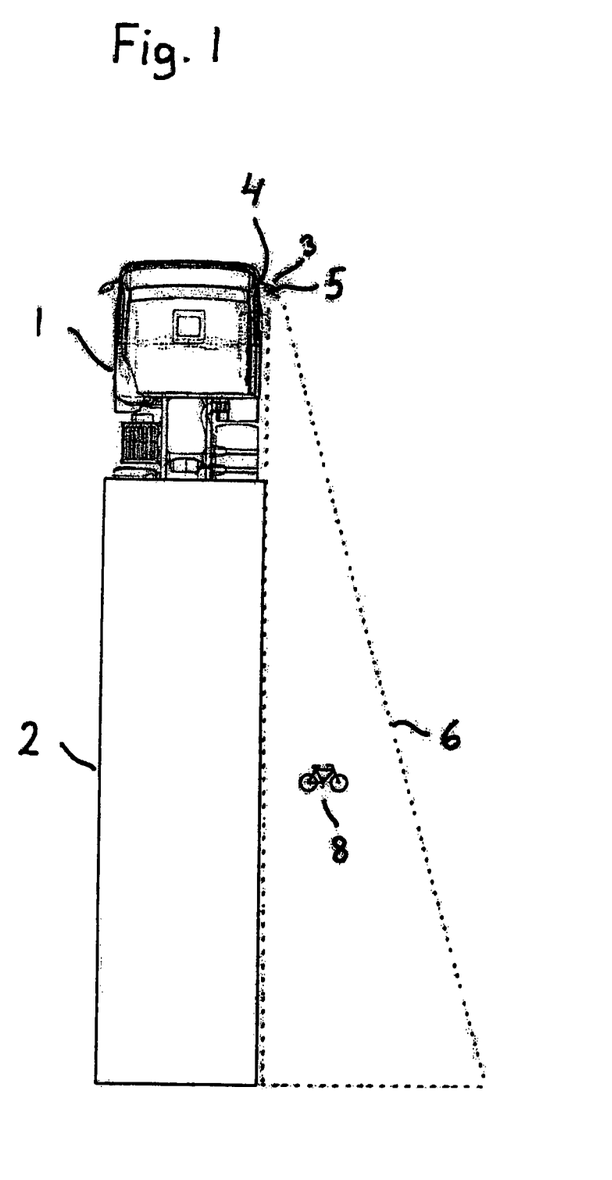
FIG. 1 depicts schematically a vehicle in a position for straight ahead driving.

As mentioned FIG. 1 depicts schematically a vehicle. In this example the vehicle comprises a truck or tractor 1 to which a trailer 2 is coupled by means of a king pin mounted in the fifth wheel of the tractor 1. The fifth wheel, king pin, electric and hydraulic coupling devices etc. are not visible or not shown in the figure, i.e. the parts are hidden by the trailer.

The tractor 1 in FIG. 1 is intended to be operated from the left side, i.e. the driver will sit in the left side of the tractor 1 when he is driving the truck. Thus, in the right side of the tractor 1 is mounted a side rearview mirror 3 according to the invention. The side rearview mirror 3 is mounted on a mounting device 4 attached to the right side of the tractor 1. The side rearview mirror 3 is rotatable and tiltable mounted on the mounting device 4 at axis 5.

The side rearview mirror 3 can be rotated and tilted to obtain an optimum rearview indicated by the dotted lines 6 showing a fan-shaped area. The rotation and the tilting are motor operated and controlled by a control unit. The control unit controlling the motor may be integrated with the motor and mounted in the mounting device 4. The control unit may also be mounted inside the tractor 1.

The control unit comprises two gyros that may be calibrated in accordance with the speed of the vehicle. The calibration may be performed when the vehicle is moving with a speed of more than about 30 km/h. When the desired speed for the vehicle is reached the gyros are reset and in this manner the gyros are calibrated and ready to perform the measurements that will be used to control the rearview mirror.

In FIG. 1 the control unit has adjusted the side rearview mirror 3 for optimum rearview for straight ahead driving and, thus, the bicycle 8 is clearly visible in the rearview mirror 3.

Figure 2:
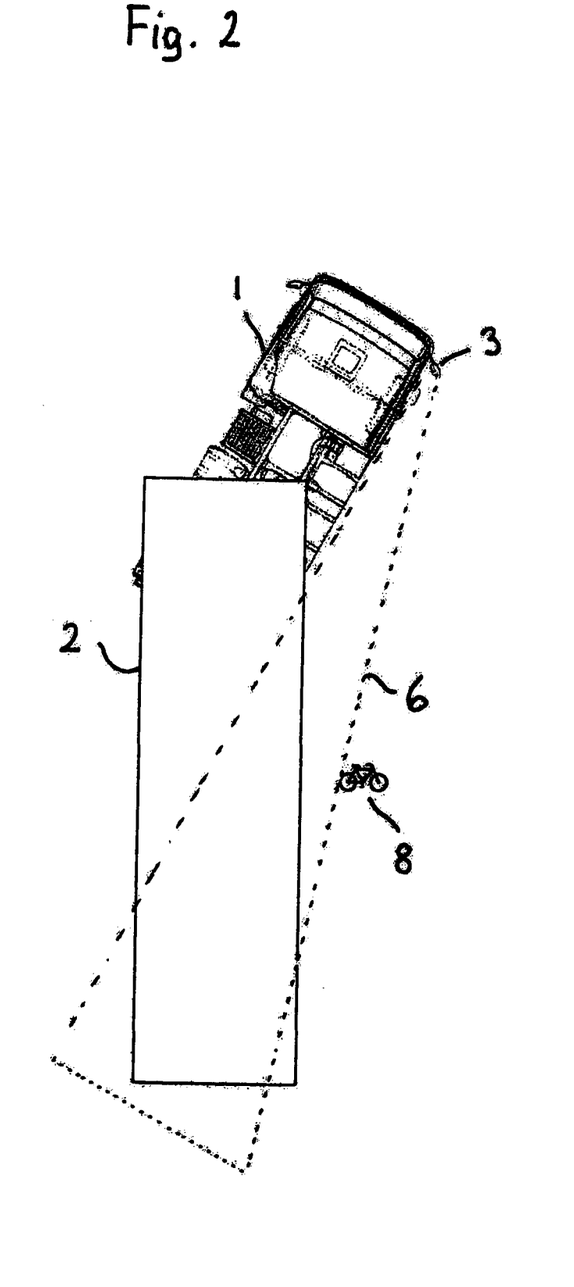
FIG. 2 depicts a vehicle without the system according to the invention making a right turn.

FIG. 2 illustrates the situation where the tractor 1 is making a right turn using rearview mirrors 3 that are not equipped with the system according to the invention, i.e. the rearview mirror 3 is the traditional fixed type rearview mirror.

The fixed rearview mirror 3 results in that the driver's rearview 6 during the right turn is orientated against the trailer 2 and the driver is not able to spot the bicycle 8. This may lead to a dangerous situation where the tractor 1 may run over the person on the bicycle 8.

Figure 3:
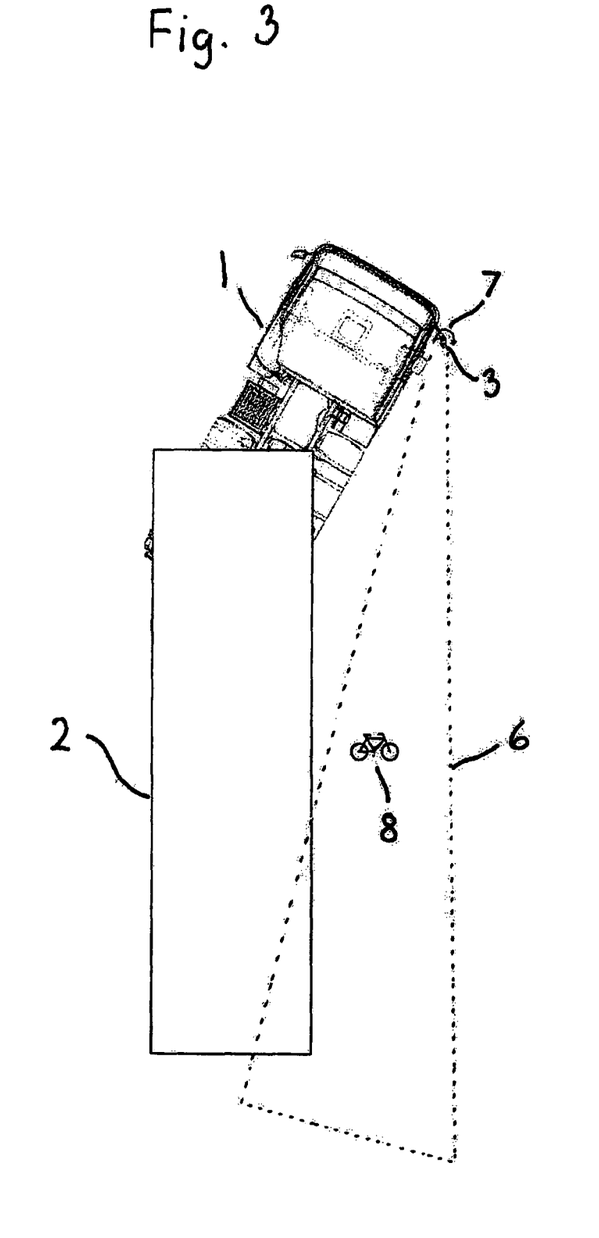
FIG. 3 depicts a vehicle with the system according to the invention making a right turn.

In FIG. 3 is illustrated the situation where the tractor 1 is making a right turn and the vehicle is equipped with a system according to the invention. In this situation the control unit has affected the motor to rotate the side rearview mirror 3 in a direction as indicated by the arrows 7. The rotation of the side rearview mirror 3 has the effect that the driver can maintain an optimum rear view during the turning. The optimum rear view is indicated by dotted lines 6 and the bicycle 8 can be clearly seen in the rearview mirror 3 whereby the driver can avoid dangerous situations and avoid accidents when turning right.

Consequently, the present invention provides a relatively simple and cost-effective solution for maintaining an optimum rear view during all situations when driving a vehicle.

Although the present invention has been described with reference to only a few embodiments, it will easily be envisaged by a skilled person that several other embodiments and variations are possible within the scope of the claims. It is clear that the present invention is also suitable for use with buses, vans etc. and a vehicle may be mounted with more than one side rearview mirror according to the invention. As previously mentioned the side rearview mirrors may alternatively be cameras connected with one or more monitors in the vehicle.

Figure 4:
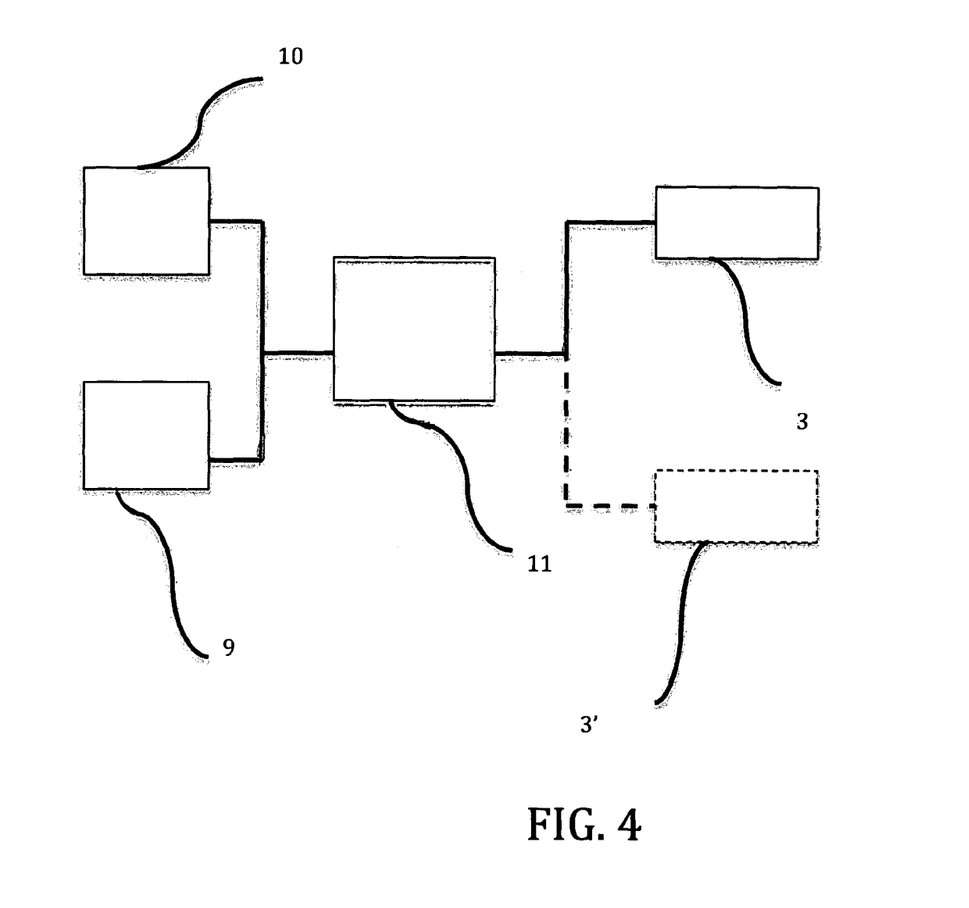
FIG. 4 depicts a system according to the invention in a schematic form.

FIG. 4 shows schematically the components of a system according to the invention. The system comprises two gyros 9,10, where on each of the gyros sensing devices have been provided for sensing a change in direction of the vehicle using the system. The sensing devices are connected to a processor 11, and provides an output signal that is fed into the processor 11, which carries out the calculation of the correct adjustment of the mirror 3,3', where mirror 3' is an optional extra mirror. The calculation as such is based on the input from the sensing devices and further on data related to the vehicle. This will be explained in further detail below. When the processor has calculated a suitable correction of the mirror position the correction signal is provided to an electric motor in the mirror, preferably a step motor providing a predetermined angular movement based on a particular input.

The calculation as such of the mirror position correction is based on the sensing device input, providing the information on the change in direction of the vehicle. In order to make the correct calculation it is however necessary to incorporate data related to the vehicle on which the system is used. These data are explained below with reference to FIG. 5.

Figure 5:
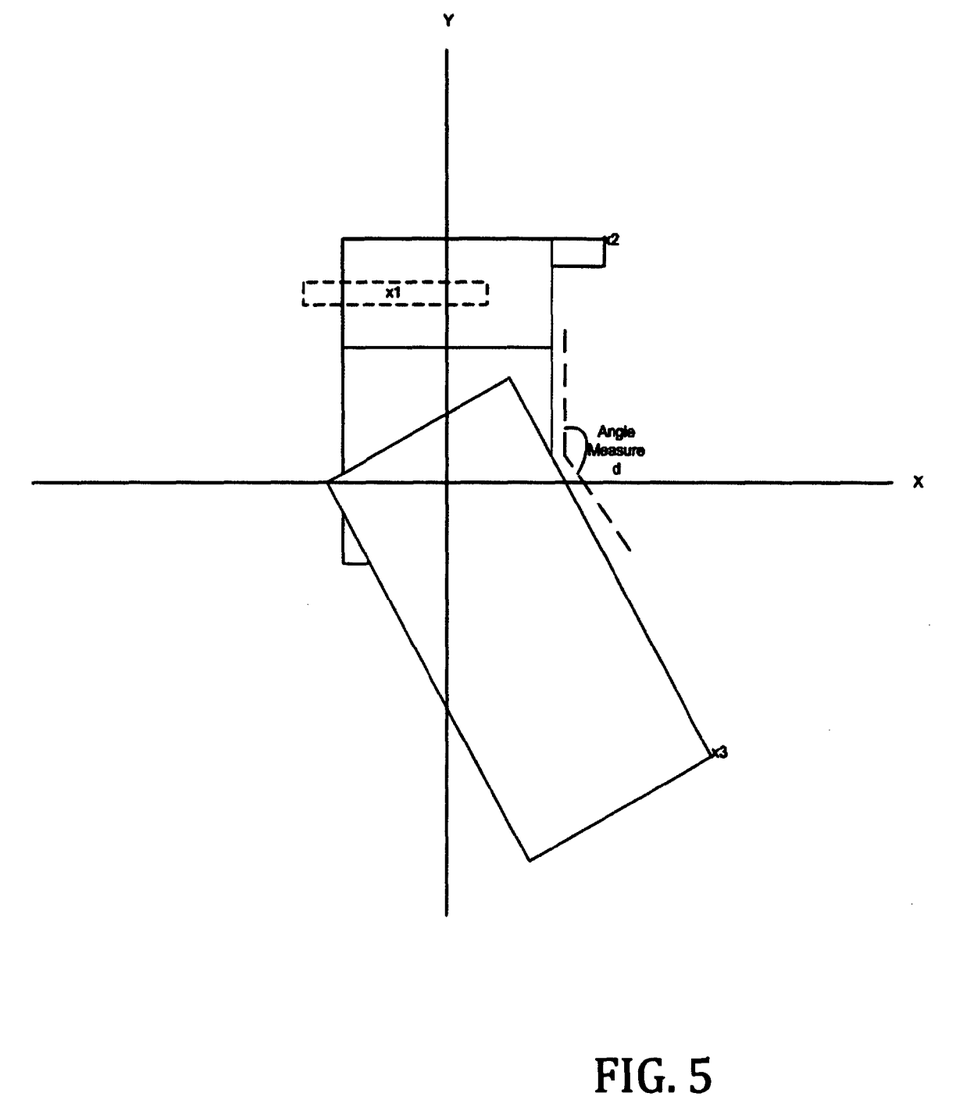
FIG. 5 shows the position of the main positions for determining the adjustment of the rearview device in a system according to the invention.

From FIG. 5 a schematic view of a tractor with an attached trailer appears. The relevant measurement points for the correction of the rearview device appear as seen in a coordinate system with its center at the joint bolt, where the tractor and the trailer are pivotally connected.

Coordinates compared to joint bolt to driver
Coordinates compared to joint bolt to driver (X1)
Coordinates compared to joint bolt to right rearview mirror (X2)
Coordinates compared to joint bolt to right rear corner of trailer (X3)

Figure 6:
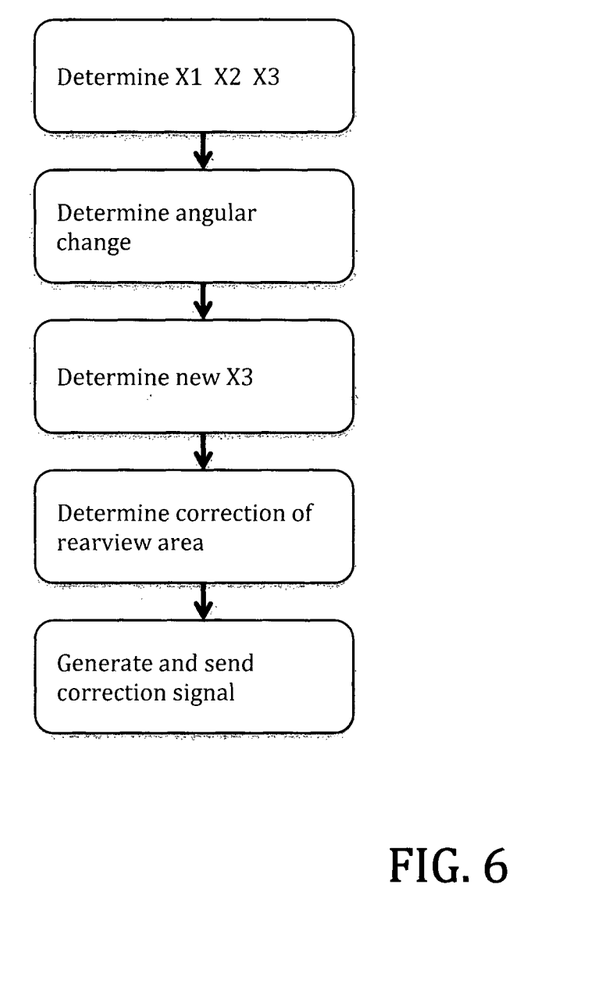
FIG. 6 shows the main steps of determining the adjustment of the rearview.

The algorithm for determining the correct adjustment may in a preferred embodiment comprise the following steps:
determining in a coordinate system with its center at the connection between tractor and trailer and with the tractor and trailer aligned in the same direction, the location of three main positions, Driver position (X1)
mirror position (X2)
trailer rear end position (X3)

Determining an angular change between the tractor and the trailer direction;
based on the angular change determine a new position of the trailer rear end;
determine a change in rearview area for the rearview device to maintain an optimum rearview,
correcting the view by adjusting mirror/camera angle correspondingly or by selecting a different part of a larger image frame of a camera.

The three main locations may obviously deviate from one vehicle to another, but the main difference will be the position of the rear end of the trailer since the length of this may vary significantly.

Statistically there are however a preference for trailers with a particular length with a small deviation to this preference. This makes it natural to have such preference as a default setting of the system. For other lengths or measures of the vehicle parts the system may comprise input means for the variables. This may be based on a database containing precise data for tractor and/or trailer or may be simple input of data on a keyboard. Identification means on the trailer and/or tractor may provide a possibility for automatic recognition of the vehicle parts and hence the correct measurements and consequently the correct adjustment of the rearview device.

The invention claimed is:

1. A system for controlling the adjustment of a side rearview device mounted on a vehicle pivotally connected to a trailer, the system comprising at least one side rearview device, configured to change view area, wherein the system comprises a control unit comprising at least two direction guides selected from the group consisting of gyros and accelerometers, wherein the direction guides comprise at least one kinetic sensing device registering change of movement direction of the vehicle, and providing corresponding output signal, wherein the control unit comprises a data processor provided for determining the adjustment of the rearview device, wherein the processor is configured for reading output signals from the sensing device, the output signals comprising:
a location of a driver of the vehicle compared to the pivotal connection,
a location of the side rearview device compared to the pivotal connection, and
a location of a rear corner of the trailer compared to the pivotal connection,
wherein at least the sensing device output provides a control signal for adjusting the rearview area and the rearview device is configured for adjusting the rear view area accordingly,
wherein one of the at least two direction guides is mounted on the vehicle and one of the at least two direction guides is mounted on the trailer.

2. The system according to claim 1 which comprises a rearview mirror or a rearview camera operated by a motor controlled by the control unit.

3. The system according to claim 2, wherein the control unit will operate the motor to change the view in the side rearview device in horizontal and vertical direction.

4. The system according to claim 2, wherein the system comprises a camera and a display in the vehicle changes view area of a larger picture frame in response to a change in direction of the vehicle.

5. The system according to claim 1, wherein the control unit comprises two gyros or two accelerometers.

6. The system according to claim 1, which comprises two side rearview devices.

7. A method for determining a correction for a rearview device in a system according to claim 1, the method comprising:
- determining in a coordinate system with a center at the pivotal connection and the vehicle and trailer aligned in the same direction, a location of three main positions, driver position compared to the pivotal connection, mirror position compared to the pivotal connection, trailer rear end position compared to the pivotal connection,
- determining an angular change between the vehicle and the trailer when the vehicle changes direction in respect of the trailer or vice versa;
- based on the angular change, determining a new position of the trailer rear end; and
- determining a change in rearview area for the rearview device to maintain a rearview.

8. A vehicle comprising the system according to claim 1.

9. The vehicle pivotally connected to a trailer according to claim 8, wherein the vehicle is selected from the group consisting of: trucks or tractors transporting heavy weight freight containers, buses, vans, and cars.

10. The system according to claim 1, wherein the direction guides will be calibrated.

11. The system according to claim 10, wherein the direction guides will be calibrated while the vehicle is moving.

12. The system according to claim 1, wherein the direction guides are detachably mounted on the trailer.

13. A system for controlling adjustment of a side rearview device mounted on a vehicle, the system comprising at least one side rearview device, configured to change view area, wherein the system comprises:
a) at least one direction guide, wherein the direction guide comprises at least one kinetic sensing device registering change of movement direction of the vehicle, and providing corresponding output signal,
b) a control unit comprising a data processor for determining the adjustment of the rearview device, wherein the processor is configured for reading output signals from the sensing device and, based on at least the sensing device output, providing a control signal for adjusting a rearview area,
wherein the rearview device is configured for adjusting the rear view area according to the control signal provided by the processor, and
wherein the system comprises a camera and a display in the vehicle which changes view area of a larger picture frame in response to a change in direction of the vehicle.

* * * * *